(12) United States Patent
Soupal

(10) Patent No.: US 6,655,750 B2
(45) Date of Patent: Dec. 2, 2003

(54) COMBINATION INVERSION AND RELAY OR QUICK RELEASE VALVE ASSEMBLY

(75) Inventor: Thomas R. Soupal, Rochester Hills, MI (US)

(73) Assignee: Meritor WABCO Vehicle Control Systems, Troy, MI (US)

( * ) Notice: Subject to any disclaimer, the term of this patent is extended or adjusted under 35 U.S.C. 154(b) by 0 days.

(21) Appl. No.: 10/033,468

(22) Filed: Oct. 19, 2001

(65) Prior Publication Data

US 2003/0075973 A1 Apr. 24, 2003

(51) Int. Cl.$^7$ .................................................. B60T 13/00
(52) U.S. Cl. .............................. 303/9; 137/269; 303/7; 303/69; 303/28
(58) Field of Search ............................ 303/9, 7, 13–15, 303/8, 71, 9.76, 40, 118.1, 113.1, 123, 28–30, 81, 86, 50–56, 68, 69, 89; 188/170; 137/102, 627.5, 269, 625.64, 625.65

(56) References Cited

U.S. PATENT DOCUMENTS

| | | |
|---|---|---|
| 3,861,754 A | 1/1975 | Kruke et al. |
| 3,863,992 A | 2/1975 | Kurke et al. |
| 4,121,873 A | 10/1978 | Durling |
| 4,348,062 A | 9/1982 | Koenig |
| 4,368,926 A | 1/1983 | Bartholomew |
| 5,170,343 A | 12/1992 | Matsuda |
| 5,335,978 A | 8/1994 | laBastide, Jr. |
| 5,340,212 A | 8/1994 | Latvala |
| 5,402,866 A | 4/1995 | Naedler et al. |
| 5,409,303 A * | 4/1995 | Engelbert et al. .............. 303/7 |
| 5,558,408 A | 9/1996 | Naedler et al. |
| 5,947,239 A | 9/1999 | Koelzer |
| 6,007,159 A | 12/1999 | Davis et al. |
| 6,062,652 A | 5/2000 | Eberling |
| 6,079,790 A | 6/2000 | Broome |
| 6,106,079 A | 8/2000 | Fisher |
| 6,234,586 B1 | 5/2001 | Davis et al. |
| 6,238,013 B1 | 5/2001 | Koetzer |

* cited by examiner

Primary Examiner—Douglas C. Butler
(74) Attorney, Agent, or Firm—Carlson, Gaskey & Olds

(57) ABSTRACT

A combination valve assembly provides dual functionality within a single valve housing. In one example, the valve operates as a combination inversion valve and quick release valve. In another example, the combination valve operates as an inversion valve and a relay valve. The valve is particularly useful for controlling the operation of a spring applied, air release brake actuator in a heavy vehicle braking arrangement. A valve designed according to this invention preferably also provides anti-compounding features.

20 Claims, 13 Drawing Sheets

COMBINATION INVERSION AND RELAY OR QUICK RELEASE VALVE ASSEMBLY

BACKGROUND OF THE INVENTION

This invention generally relates to a valve for controlling vehicle brake operation. More particularly, this invention relates to a combination valve assembly that operates as a combination inversion and relay or inversion and quick release valve.

Heavy vehicles such as trucks typically include air powered brake systems. To protect against brake failure in the event of a loss of air pressure, emergency brake arrangements include a spring that applies a mechanical braking force to stop the vehicle in the event of a brake system pressure failure. Such arrangements are typically referred to as spring applied, air release brake systems. Such arrangements are well known.

The brake actuators of conventional brake systems typically include a service chamber and a spring chamber. The service chamber is selectively pressurized to apply a braking force at the actuator. The pressure is typically controlled by a manually operated foot brake pedal. The spring chamber houses a spring that is biased to apply a braking force. Air pressure within the spring chamber acts against the bias of the spring to hold off any braking force that would be imposed by the spring. By selectively controlling the pressure within the spring chamber, the emergency brake operation is controlled.

The spring housed within the spring chamber typically also serves as a parking brake. When it is desirable to park a truck and apply the parking brake, the pressure is released from the spring chamber and the spring is free to move into a position to apply the parking brake. This is typically controlled using a manually operated valve mounted on the dash within the vehicle. Such arrangements are well known.

Typical brake systems include an inversion valve within the air conduits for selectively controlling the supply of air pressure to the spring chamber. In addition to the inversion valve, a quick release valve or a relay valve is also used for controlling the supply of air pressure to the spring chambers. Two separate valves each in their own housing are commonly used. The use of two valves introduces complexities and expenses into the braking system. Additional tubing or other connections are required between the multiple valve housings. Additionally, each valve housing contains a number of components, which introduces complexity and expense into the system.

It is desirable to reduce the cost of vehicle braking systems while still providing the function of the emergency and parking brake needed to meet government regulations, for example. Moreover, it is desirable to reduce the complexity of the system, reduce installation labor, reduce the number of components and material required and to facilitate easier maintenance of a vehicle brake system. This invention addresses those needs by providing a unique combination valve arrangement where the functions of an inversion valve and a quick release or a relay valve are incorporated into a single valve assembly having a single housing.

SUMMARY OF THE INVENTION

In general terms, this invention is a combination valve that provides the combined features of an inversion valve and a relay valve or an inversion valve and a quick release valve depending on the particular configuration.

In one example, a vehicle brake system designed according to this invention includes at least one brake actuator having a service chamber and an emergency chamber. the service chamber is pressurized to apply a braking force. The emergency chamber is pressurized to hold off a braking element (i.e., a spring) that otherwise provides an emergency braking force. A pressure source provides fluid pressure to the brake actuator to control the application of a braking force. Only one valve couples the brake actuator emergency chamber to the pressure source. The valve has an inlet coupled to the pressure source and an outlet coupled to the emergency chamber. The valve includes a single piston that moves responsive to pressure at the inlet from the first position where pressure is exhausted from the emergency chamber to a second position where the emergency chamber is pressurized.

By controlling the movement of the piston within the valve, the amount of pressure to the emergency chamber is selectively controlled. The valve allows for applying different amounts of braking force using the braking element (i.e., the spring) within the emergency chamber.

In one example, the single valve is a combination inversion and relay valve. In this example, there is an inlet to the valve that is directly coupled to the pressure source. A second inlet is coupled to a dash valve that is controlled by a vehicle operator to release or set a parking brake.

In another example, the valve is a combination quick release and inversion valve. In this example, only one inlet to the valve is coupled to the dash valve control. The other inlet, which was used in the relay valve example, preferably is plugged. Additionally, a separate flow path within the valve housing is opened in the inversion valve example.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
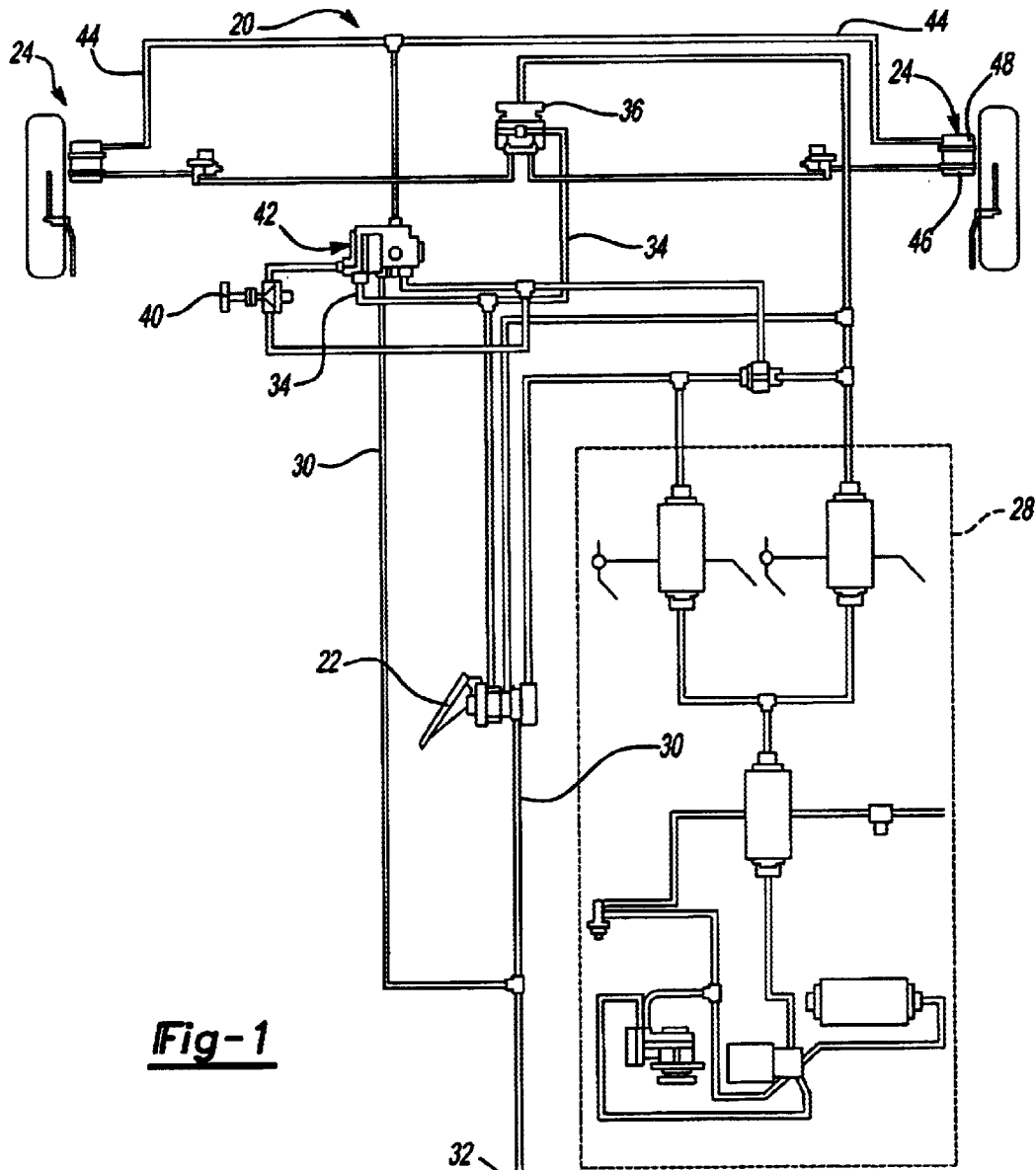
FIG. 1 schematically illustrates a vehicle brake system designed according to this invention.
Figure 2:
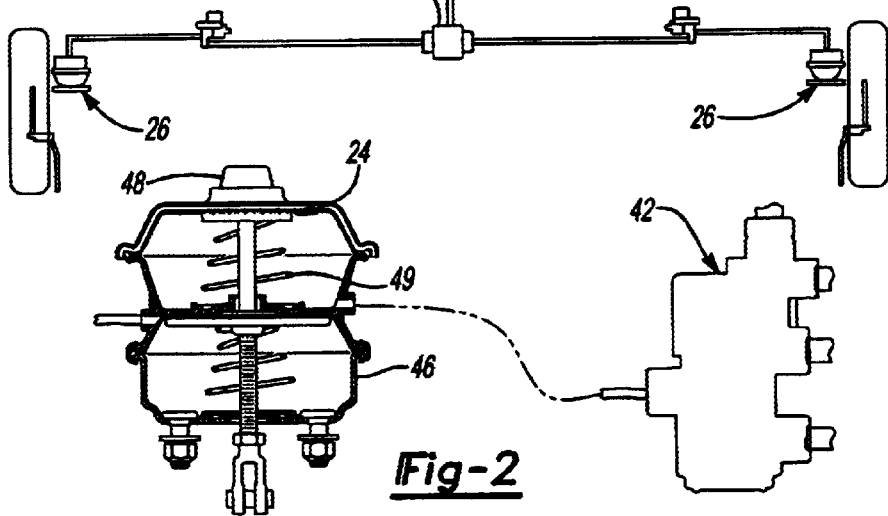
FIG. 2 schematically illustrates a brake actuator as known in the art coupled with a valve designed according to this invention.

A vehicle brake system 20 includes a conventional foot pedal 22 that allows a vehicle operator to selectively apply the service brakes. The illustrated example includes two primary brake actuators 24 and two secondary brake actuators 26. As known in the art, the rear wheels of a truck are commonly referred to as having the primary brake actuators. The front wheels of the truck are typically referred to as the secondary brake actuators.

An air pressure arrangement 28 supplies pressure through a first conduit path 30, which includes a quick release valve 32 to apply pressure to the secondary brake actuators 26. Another pressure path 34 provides pressure to the service chambers of the primary brake actuators 24 responsive to actuation of the foot pedal 22. The brake actuators themselves, are known in the art and operate as known. A service relay valve 36 controls the supply of pressure to the service chambers of the primary actuators 24.

A parking brake control valve 40 allows a vehicle operator to apply a parking brake. In the illustrated example, the parking brake actuator is a manually controlled, hand-operated valve that has a control portion mounted on the dash of the vehicle. By appropriately manipulating the control member, the vehicle operator either applies or releases the parking brake.

The primary brake actuators 24 include a service chamber 46 that is pressurized by air to apply the brakes. A spring chamber 48 houses a spring 49 as known. Air pressure with the spring chamber 48 controls the position of the spring 49 and, therefore, the application of a braking force by the spring. When no air pressure is within the spring chamber 48, for example, the spring 49 is fully extended and a braking force is applied. This occurs, for example, when the parking brake is set. This condition also occurs under a total failure of the pressure supply to the primary actuators and the spring 49 serves as an emergency braking applicator. The operation of such brake actuators is known.

A combination valve 42 controls a supply of pressure through a conduit air path 44 to the spring chambers 48 of the primary brake actuators 24. The single valve 42 operates as a combination inversion and relay valve or a combination inversion and quick release valve, depending on the needs of a particular situation. As will become apparent from the description that follows, a minor modification to the single valve assembly 42 controls whether it operates as a relay or quick release valve. Utilizing a single valve 42 reduces the number of components in the brake system, simplifies installation and reduces the cost of the overall system, including the cost for maintenance over the life of the system.

Figure 3:
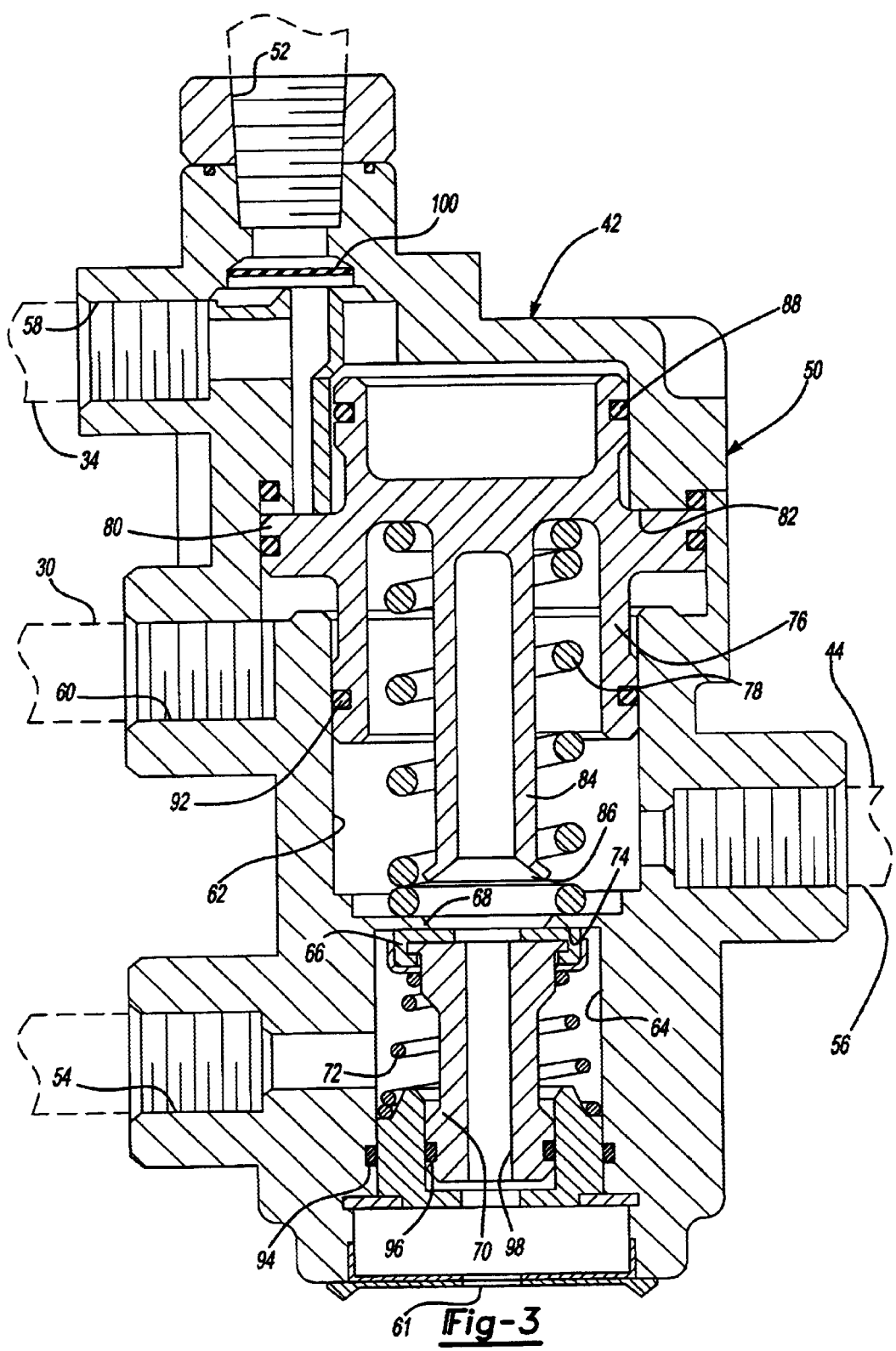
FIG. 3 is a cross sectional illustration of a valve designed according to this invention that operates as a combination inversion and relay valve.

FIG. 3 is a cross sectional illustration of one example valve assembly 42 designed according to this invention. This particular example functions as a combination inversion and relay valve.

The valve 42 has a single valve housing 50 that includes a number of ports. An inlet port 52 preferably is coupled to the parking brake actuator valve 40. An inlet port 54 preferably is directly coupled to the pressure source 28. An outlet port 56 preferably is coupled directly to the spring chamber 48 of the primary brake actuators 24. Inlet ports 58 and 60 preferably are coupled to the supply lines containing the pressure for applying the service brakes in the primary and secondary brake lines, respectively. An exhaust port 61 preferably permits exhausting system pressure to atmosphere.

The housing 50 includes two inner chambers 62 and 64. A seal member 66 is operative to close off communication through an opening 68 that extends through an interface between the first chamber 62 and the second chamber 64. A piston 70 is associated with the seal member 66 and positioned within the second chamber 64. A biasing member such as a spring 72 preferably urges the piston 70 into a position where the seal member 66 contacts a surface 74 adjacent the opening 68.

The first chamber 62 houses a piston 76 that preferably is biased into a position away from the opening 68 between the two chambers (i.e., upward according to the drawing). The piston 76 preferably includes a flange portion 80 that is urged against a stop surface 82 by the bias of the spring 78. The piston 76 includes a central arm portion 84 that has a terminal end 86 that is adapted to be received through the opening 68 to make contact with the seal member 66 as will be explained below.

The flow of air or other fluid through the various ports and between the chambers of the valve 42 preferably are controlled based upon the air pressure applied at the different ports. A plurality of seals such as O-rings 88, 90 and 92 prevent unwanted flow around the piston 76. Similarly, a plurality of seals 94 and 96, which may be O-rings, prevent undesirable flow around the piston 70.

The piston 70 preferably includes a central opening 98 extending through the piston that allows fluid communication through the opening 68 and the exhaust port 61.

Figure 4:
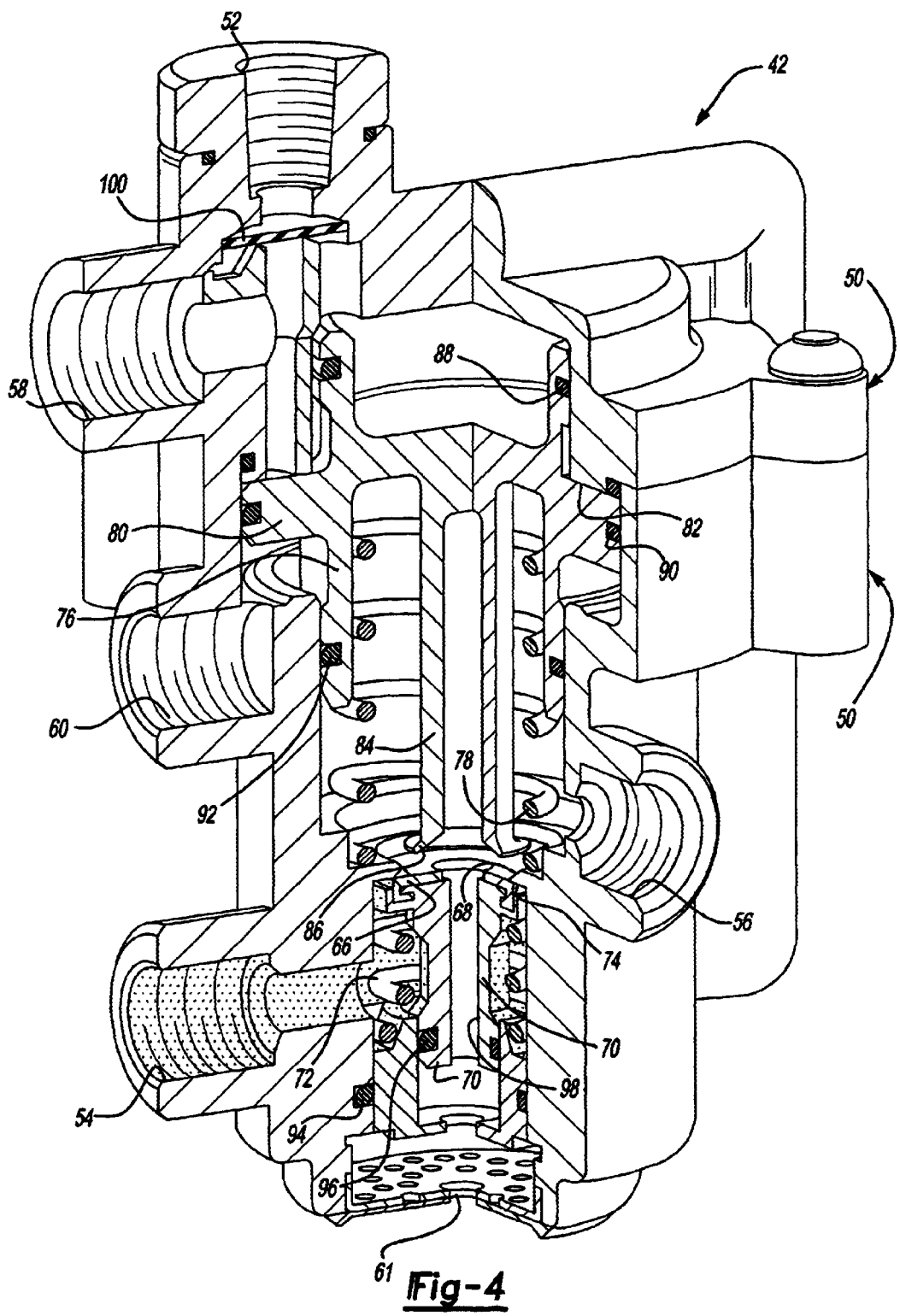
FIG. 4 is a partially cut away, perspective illustration of a valve designed according to this invention that operates as a combination inversion and relay valve in a first operation condition where the vehicle parking brake is applied.

FIGS. 3 and 4 show the valve 42 in a first operating condition where the parking brake is applied. Since there is no pressure within the spring chamber 48, there is no pressure at the port 56 or 52 of the valve 42. Similarly, because the service brakes are not applied there is no pressure at the ports 58 and 60. There is pressure, however, at the port 54. This pressure does not have an affect on the position of the valve components as illustrated in FIG. 4 because the bias of the spring 72 on the piston 70 positions the seal member 66 against the surface 74, which prevents any fluid flow beyond the second chamber 64.

Figure 5:
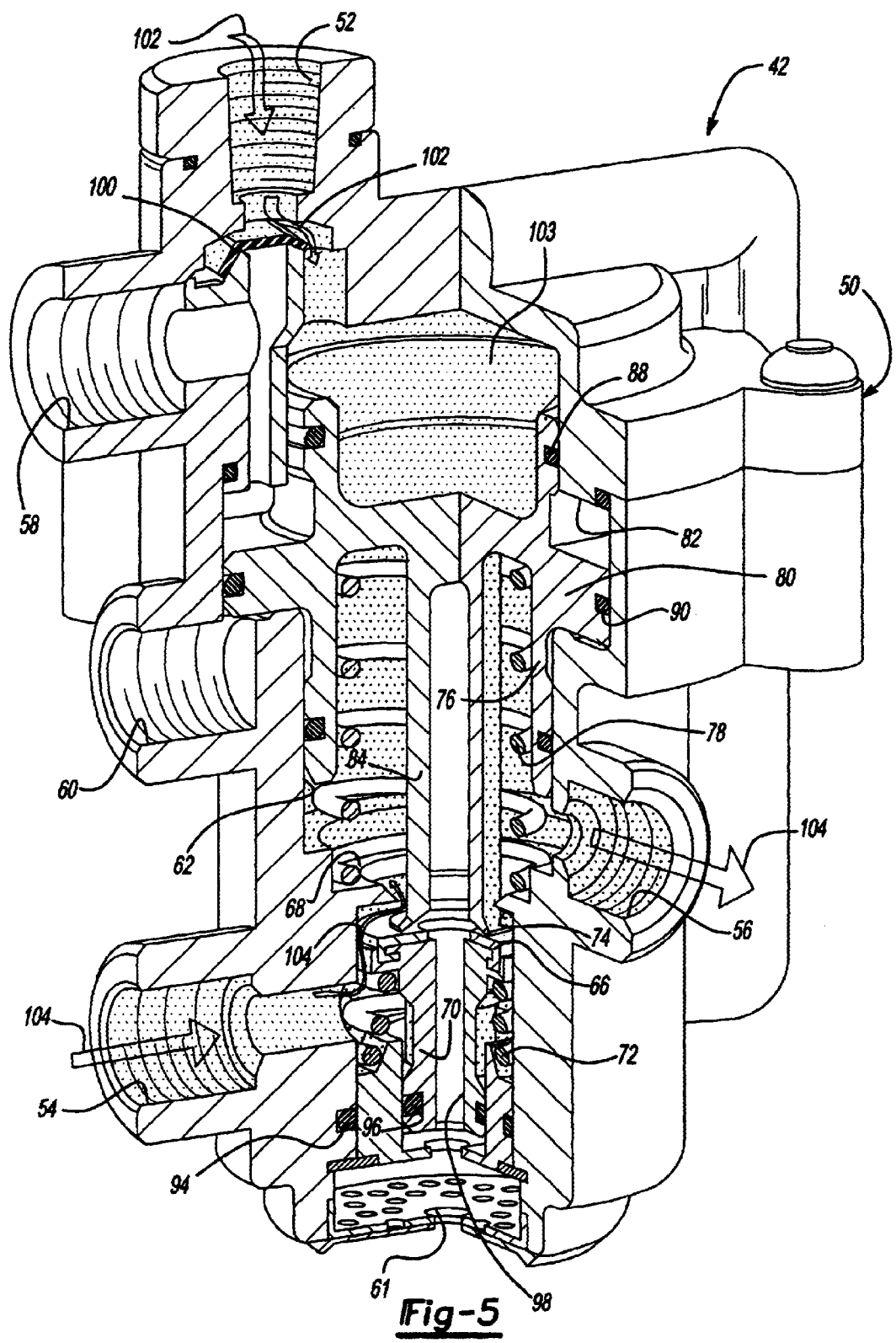
FIG. 5 is an illustration of the embodiment of FIGS. 3–4 in a second operating condition where the vehicle parking brake is released and the service brakes are not applied.

FIG. 5 illustrates the valve 42 in another operating state. In this instance, the dash valve 40 has been utilized by the vehicle operator to release the parking brake. Under these circumstances, pressure is applied through the port 52, because the dash valve 40 effectively couples the port 52 to the pressure reservoir 28.

The pressure flow through the port 52 causes deformation of the preferably flexible seal member 100 and results in fluid flow as shown at 102. A portion 103 of the first chamber 62 above (according to the illustrations) the piston 76 is pressurized. The dotted areas in the figures are used to illustrate pressurized portions of the valve 42. The pressure acting on the top (according to the drawing) portion of the piston 76 urges the piston 76 against the bias of the spring 78. When the pressure is great enough, the terminal end 86 of the arm 84 of the piston 76 contacts and moves the seal 66 away from the surface 74. The end 86 and seal 66 preferably are sealingly engaged in this condition. This results in opening a flow passage through the opening 68. Accordingly, pressure from the main reservoir 28 comes through the port 54 and exits the port 56 to apply pressure within the spring chamber 48 of the primary brake actuators 24. This flow is shown at 104. Under these circumstances, the parking brake is released.

The pressure through the port 52 is operative to open the valve 42 sufficiently so that pressure from the reservoir 28 adequately pressurizes the spring chamber to completely release the parking brake. Given this description and the known characteristics of commercially available brake actuators, those skilled in the art will be able to select appropriate valve component characteristics, such as the spring constant of the spring 78, to achieve the desired level of performance for a particular system.

Accordingly, the operating condition of FIG. 5 can be described as a pre-parking brake released condition.

Figure 5A:
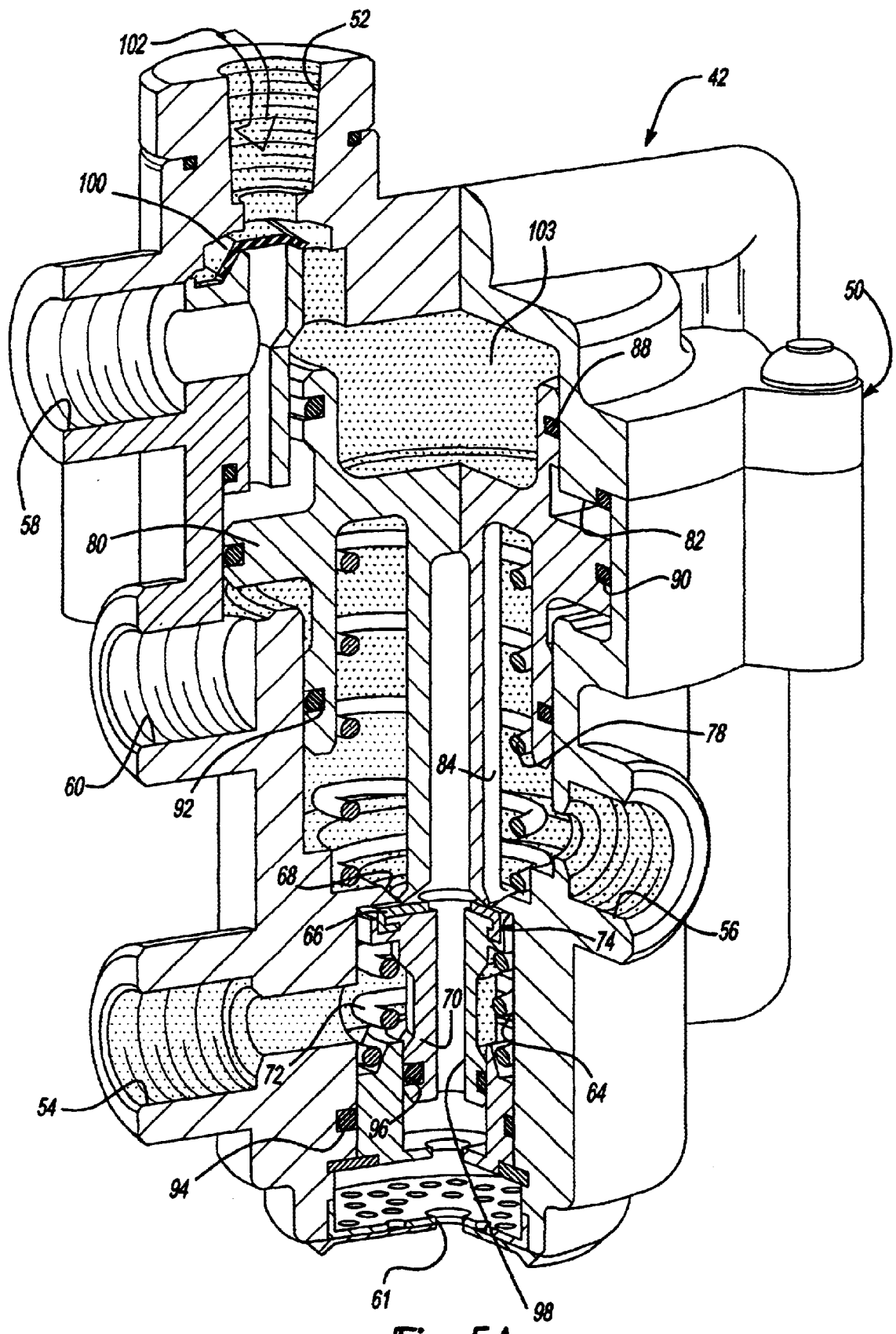
FIG. 5A is an illustration with the driving condition with no brakes applied.

When the delivery pressure in the cavity 62 reaches 100 psi, then its upward force on piston 76 plus the upward force of spring 78 will be equal to the downward force on the piston 76 from air pressure in portion 103 above the piston 76. In this position the terminal end 86 of the arm 84 of the piston 76 is in contact with the seal 656, which also is in contact with the seat 74. The value is said to be at "lap." This is the driving condition with no brakes applied shown in FIG. 5A. Because the foot actuated brake pedal 22 is not activated, there is no pressure in the service brakes at the primary port 58 or secondary port 60.

Figure 6:
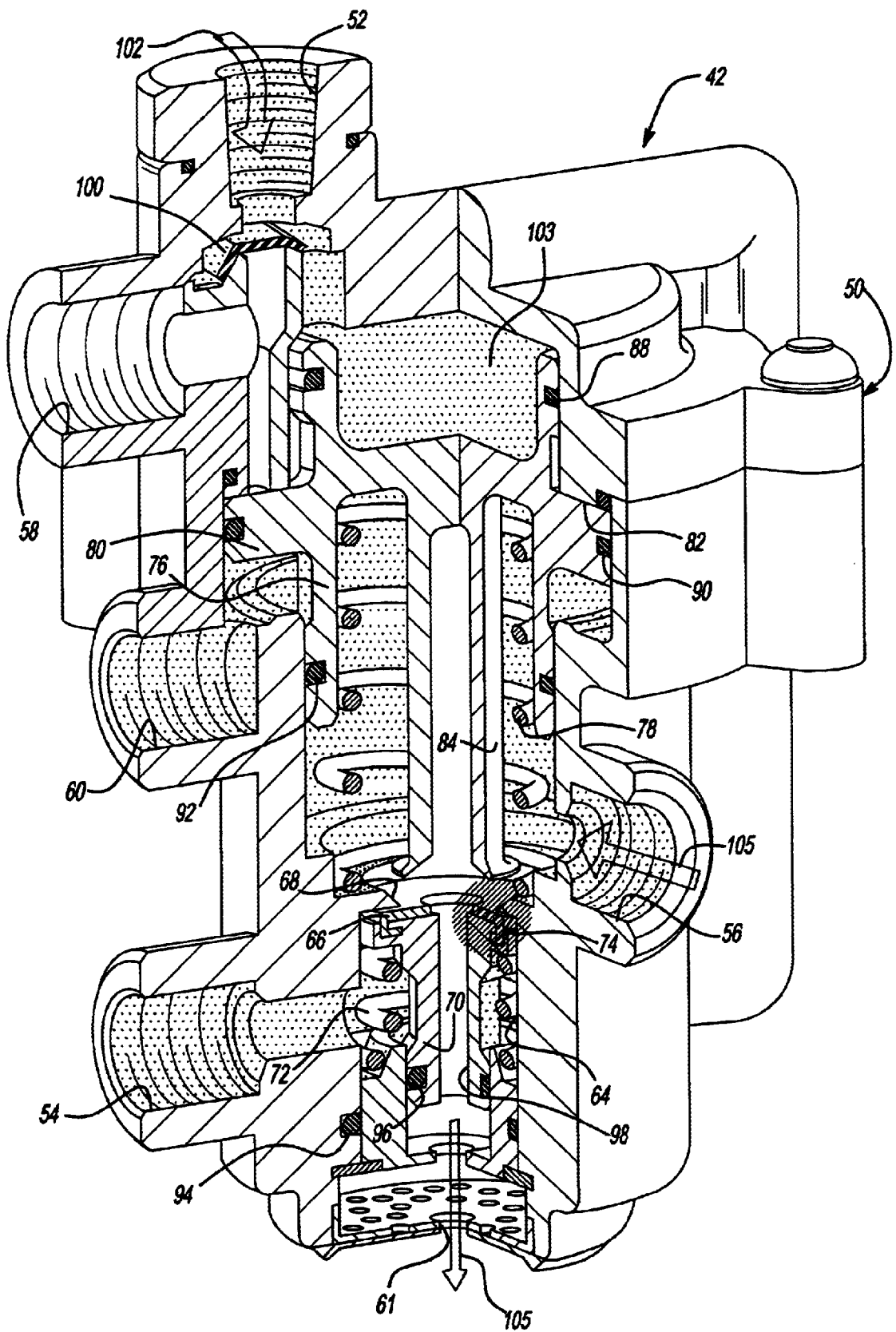
FIG. 6 is an illustration of the embodiment of FIGS. 3–5 in a third operating condition when the service pressure to the primary brakes has failed but there is pressure to the secondary brakes.

FIG. 6 illustrates another operating condition of the valve 42. This condition can be described as a brake applied, primary line pressure failure condition. In this condition, the valve 42 is operative to cause the spring chamber of the primary brake actuators to operate as a service brake chamber so that the spring 49 provides a controlled braking force.

Pressure at the port 52 exists because the dash valve 40 is open. Similarly, pressure from the reservoir 28 is present at the port 54.

The illustrated condition includes an application of the foot brake pedal 22. Because the primary brake line 34 does not have pressure (i.e., there is some failure within the system), there is no pressure at the inlet port 58. The secondary brake line 32, however, is pressurized and there is pressure present at the port 60 and on the secondary side (i.e., the lower side in the illustration) of the flange 80. The imbalance of pressure on opposite sides of the flange 80 of the piston 76 urges the piston upward (according to the drawing). Increased foot pedal pressure causes an increase in pressure at the port 60. Therefore, the upward movement (according to the drawings) of the piston 76 corresponds to the degree of actuating of the brake pedal.

As the pressure at the port 60 increases and acts on the lower (according to the drawings) side of the flange 80, the piston 76 moves such that the seat 86 lifts off from the seal member 66. Accordingly, air from the spring brake chamber 48 will pass between seat 86 and seal member 66 as shown at 105. This air passes through the central bore 98 of the piston 70 and out the exhaust port 61. The exhaust of air pressure 105 out the exhaust port 61 results in decreased pressure in the spring chamber 48 such that the spring 49 applies a braking force within the primary brake actuators 24. Greater pressure applied to the foot pedal 22 results in a correspondingly increased flow 105 from the spring chamber 48. If the pedal pressure is sufficient, the pressure at the port 60 (in combination with the bias of the spring 78) will be great enough to exhaust all of the pressure in the spring brake chamber 48 so that there is no pressure left within the spring chamber 48 to hold back the spring 49.

Figure 13:
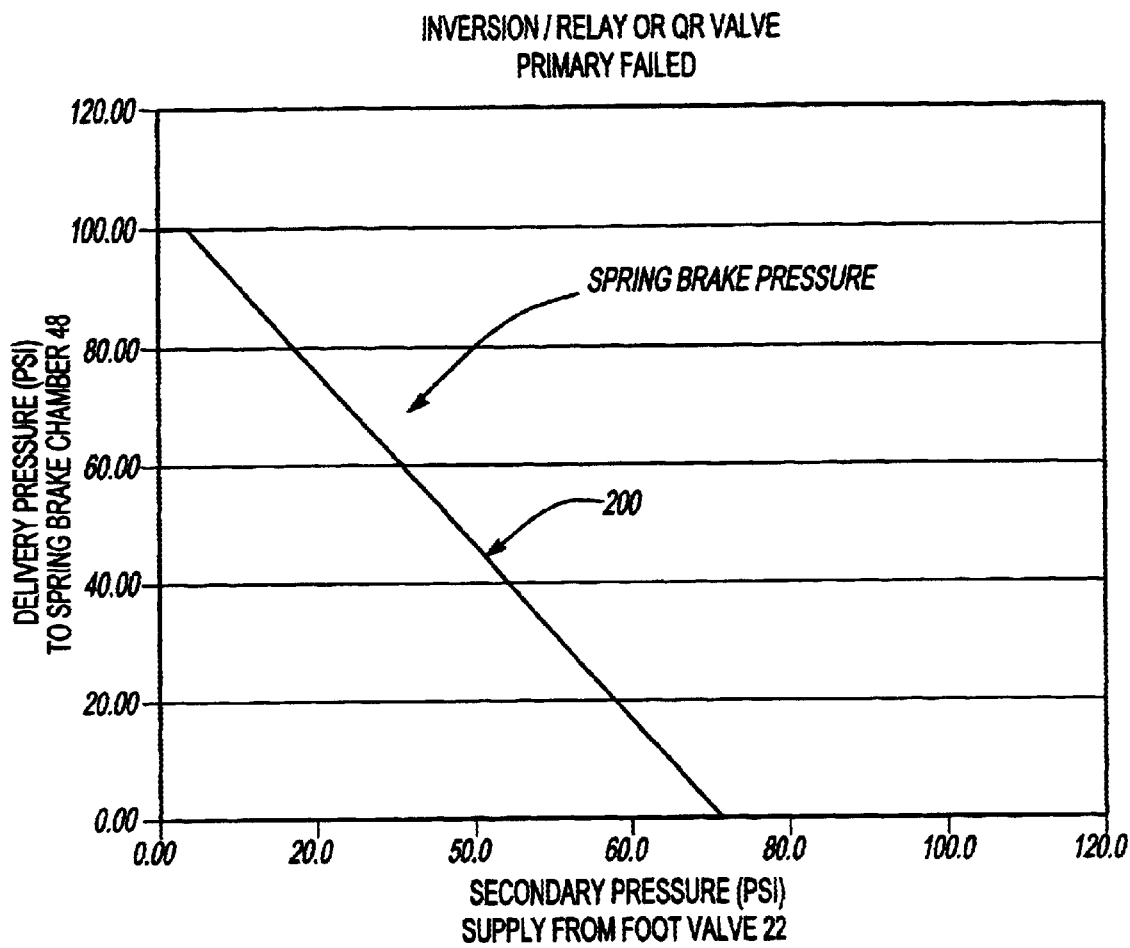
FIG. 13 graphically illustrates a performance characteristic of the illustrated example under a condition where an emergency chamber portion of a brake actuator is used as a service brake chamber.

An advantageous feature of a valve designed according to this invention is that the spring 49 can act as the main braking force applier when there is a pressure failure in the primary brake lines 34 and the amount of force applied by the spring 49 can be controlled proportional to the degree of foot pedal 22 actuation. This feature is graphically illustrated in FIG. 13, where the plot 200 shows the relationship between the pressure supplied to the spring chamber 48 and the pressure applied using the foot pedal 22.

Figure 7:
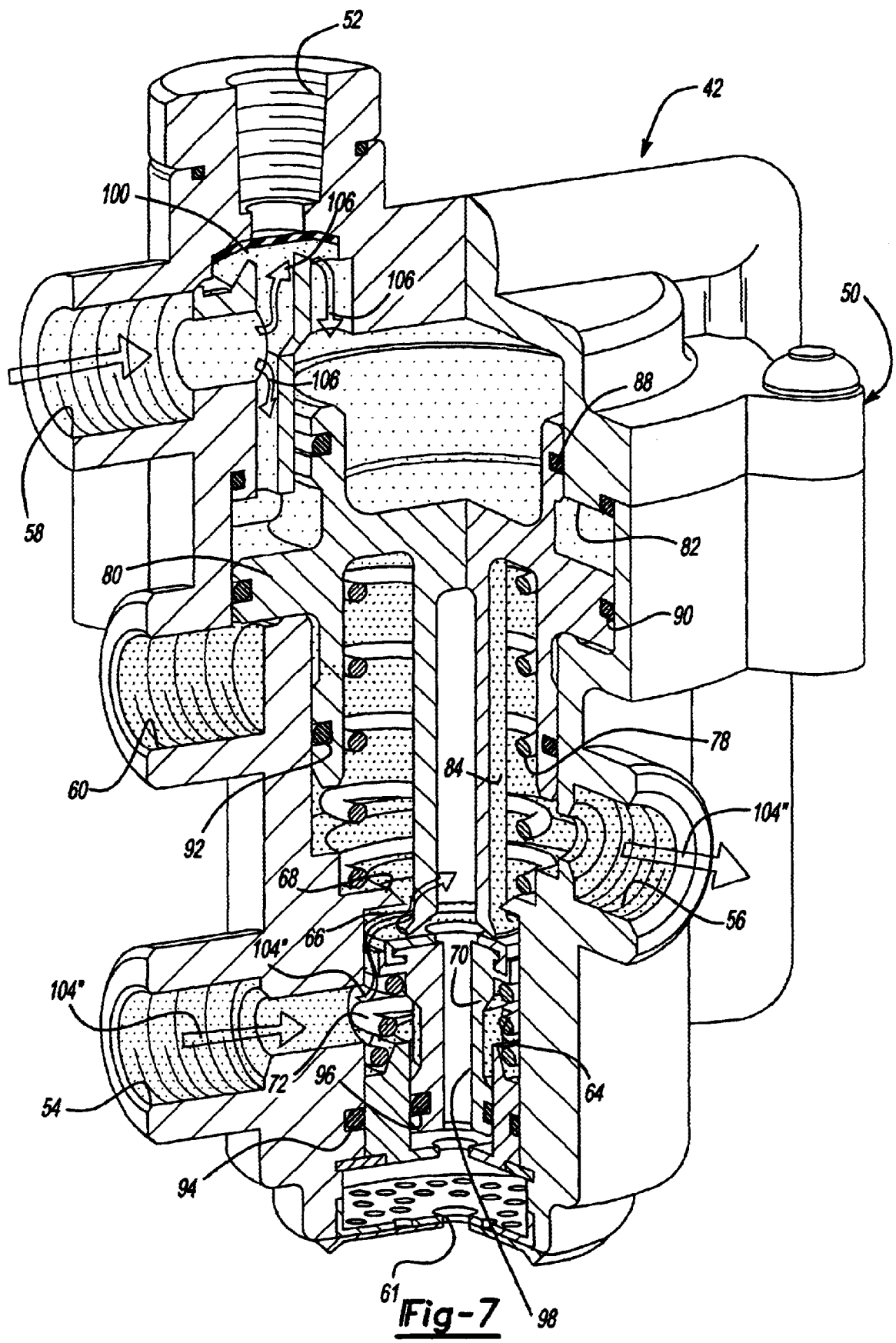
FIG. 7 is an illustration of the embodiment of FIGS. 3–6 in a fourth operating condition where the valve provides an anti-compounding feature.

FIG. 7 illustrates a preferred anti-compounding feature of a valve designed according to this invention.

The valve preferably begins in the state illustrated in FIG. 4 where the parking brake is applied. Because the flow path through the central bore 98 in the piston 70 is open, all air pressure from the spring chamber 48 is evacuated through the exhaust 61. Without air pressure in the spring chamber 48, the spring 49 applies a parking brake force. In the event that an individual inadvertently actuates the foot pedal 22 when the spring 49 is applying a parking brake force, the valve 42 preferably operates to provide an anti-compounding feature. Avoiding additional brake pressure as caused by actuation of the foot pedal 22 is advantageous for reasons recognized in the art such as avoiding damage to various brake system components.

As illustrated in FIG. 7, when the foot pedal 22 is actuated while the parking brake is applied, pressure exists at the ports 58 and 60, which are coupled to the primary and secondary braking lines, respectively, as mentioned above. The increasing pressure from the primary side results in a fluid flow shown at 106. The pressure from the primary lines coming into the port 58 causes the valve member 100 to close off the port 52. The fluid flow then results as shown at 106. The increased pressure at the top (according to the drawings) side of the piston 76 urges the piston against the bias of the spring 78. The arm 84 then engages the seal member 66 which opens the opening 68 and pressure flow is available as shown at 104" to the spring chamber 48. Accordingly, an anti-compounding effect (i.e., a release of the spring braking force) is provided that is proportional to the amount of foot pedal actuation. Therefore, a valve designed according to this invention preferably includes the capability of having an anti-compounding feature to avoid possible damage to brake system components that would otherwise be caused by an inadvertent actuation of the brake pedal 22 while the spring 49 is applying a parking brake force.

The preceding illustrations pertain to a valve assembly designed according to this invention that operates as a combined inversion valve and relay valve. A valve designed according to this invention may also operate as a combined inversion valve and quick release valve. The following description pertains to such an example.

Figure 8:
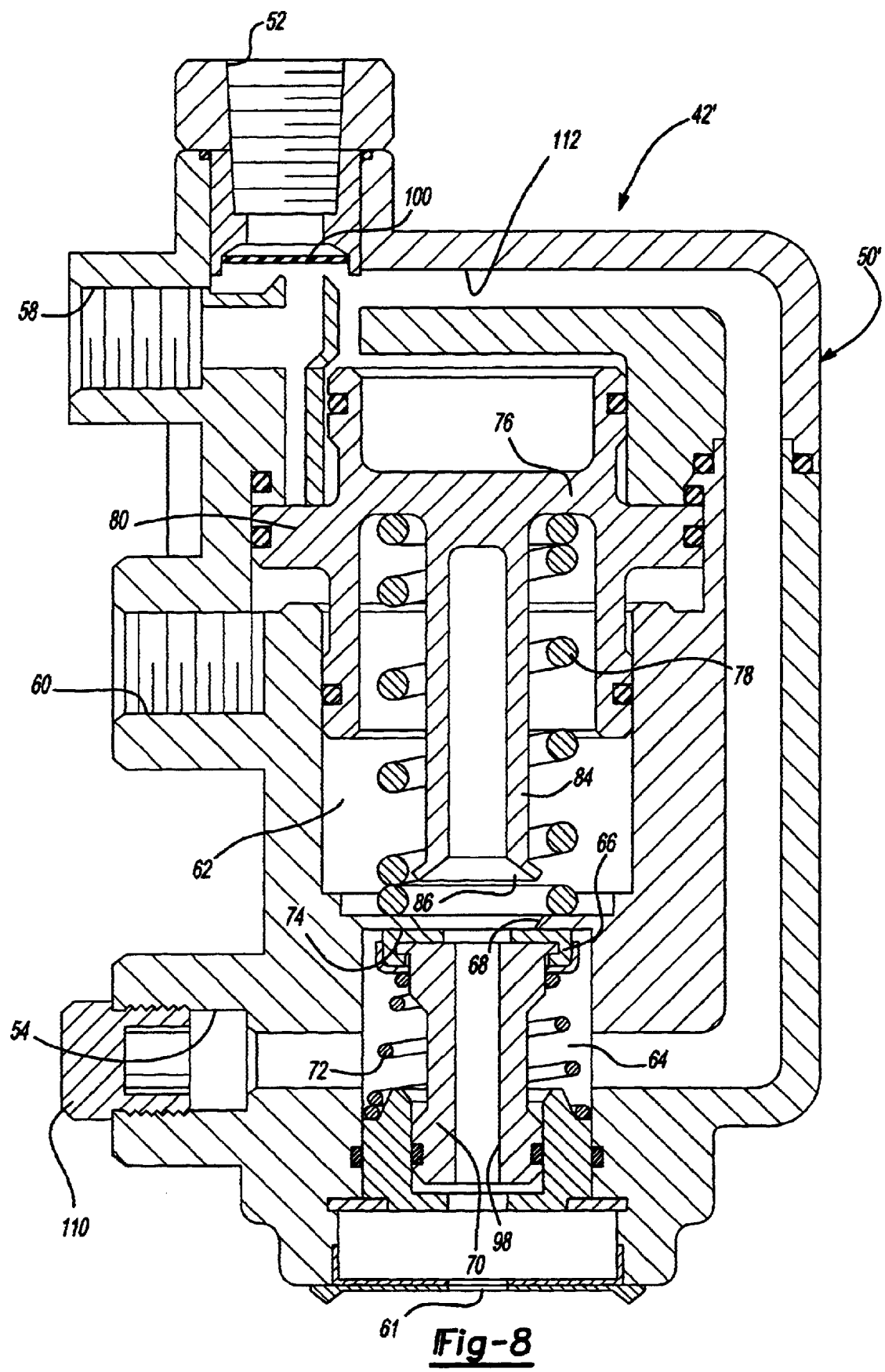
FIG. 8 is a cross sectional illustration of a valve designed according to this invention that operates as a combination inversion and quick release valve.

FIG. 8 shows a combination inversion and quick release valve 42. The port 54 is no longer connected to the pressure supply 28. Instead, the port 54 is closed off using a plug 110.

Figure 10:
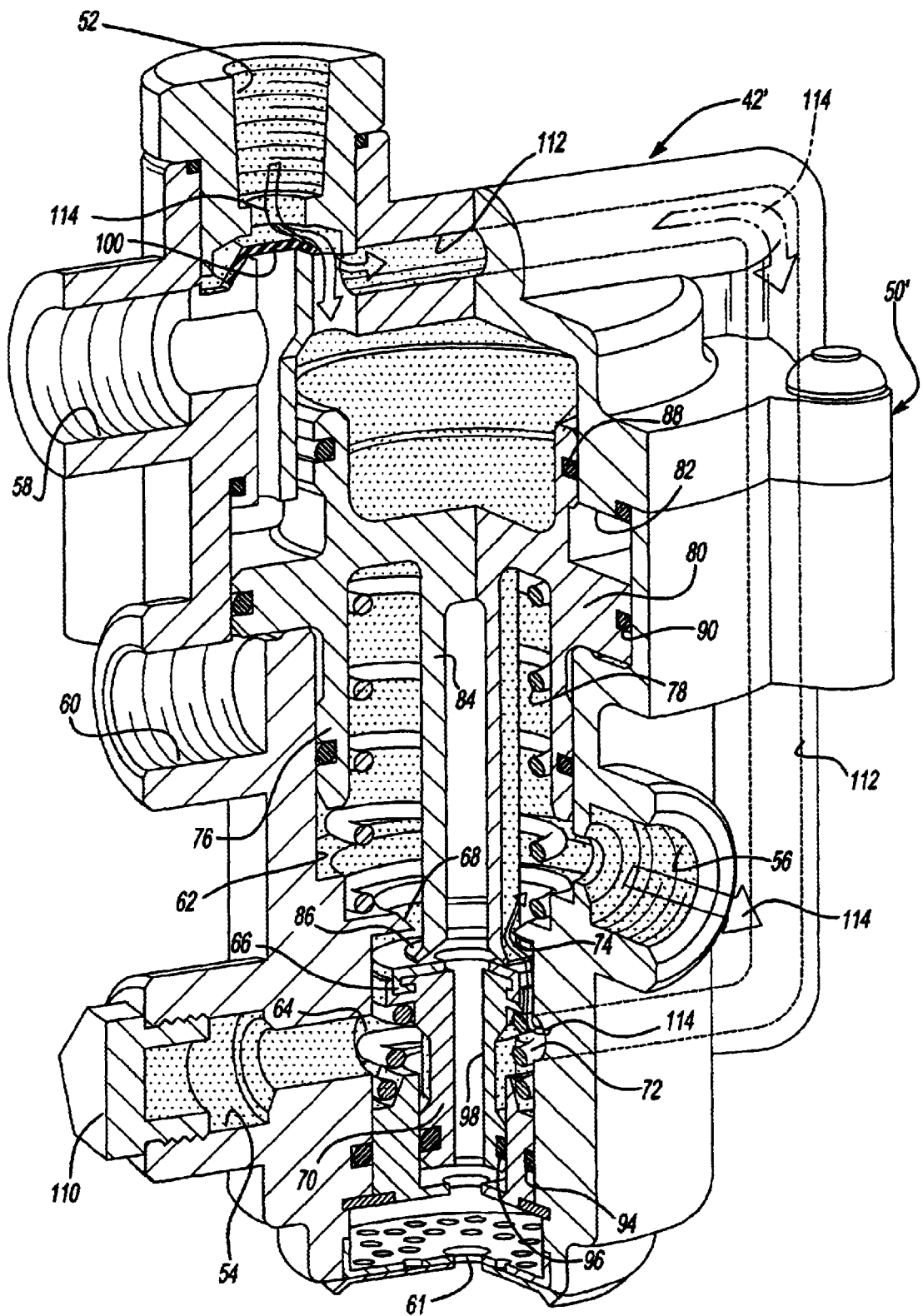
FIG. 10 is a partially cutaway perspective illustration of the embodiment of FIGS. 8–9 shown in a second operation condition where the parking brake is released and the service brakes are not applied.
Figure 11:
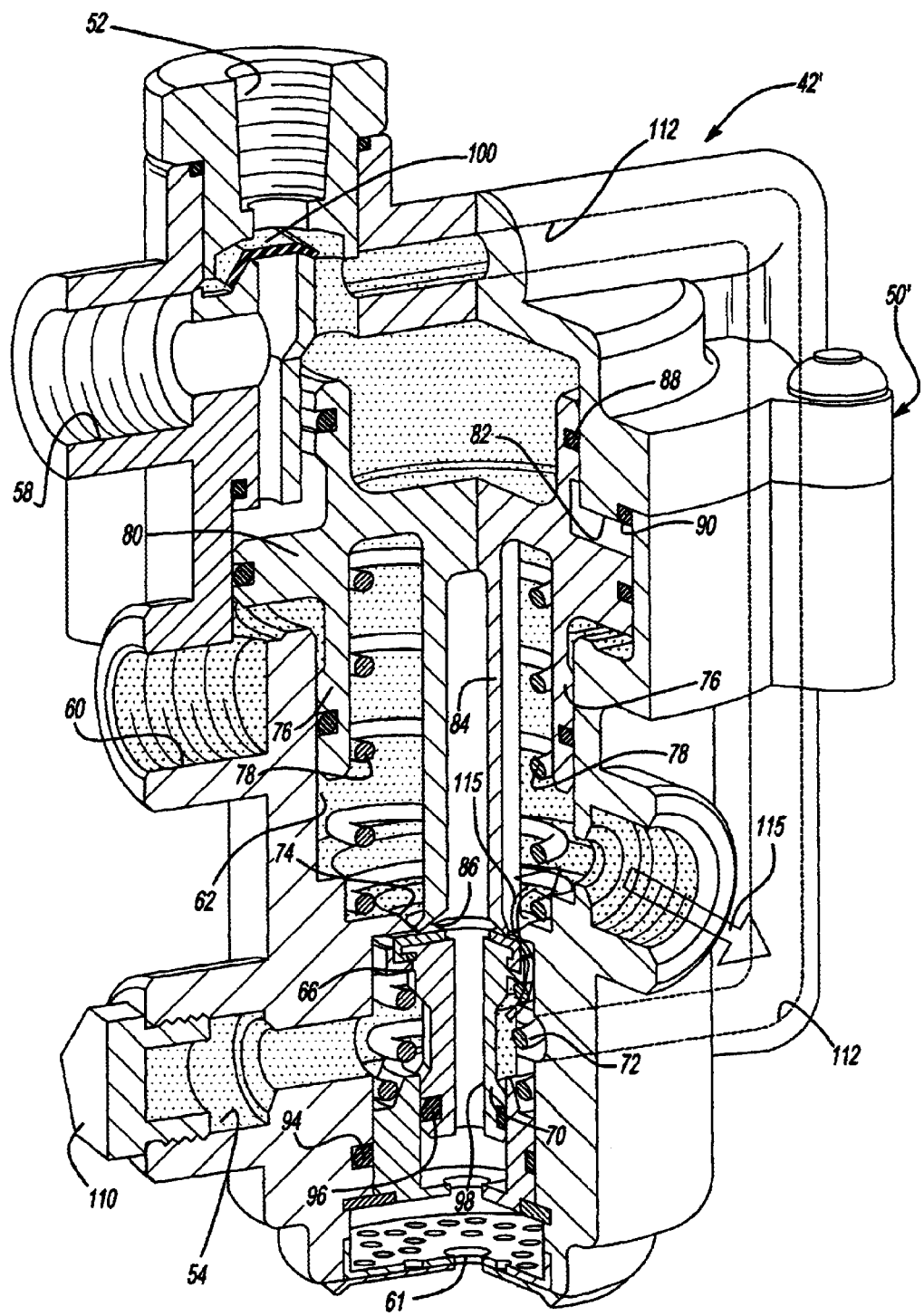
FIG. 11 is an illustration of the embodiment of FIGS. 8–10 in a third operating condition where the service brakes are applied but the primary brake air pressure has failed.

Additionally, the combination inversion valve and quick release valve assembly 42' has an additional flow path 112 that is in communication with either the port 52 or 58 depending on the position of the valve member 100 and second chamber 64 of the valve. FIG. 8 is a cross sectional illustration best showing the flow path 112 while FIGS. 9, 10 and 11 show the flow path 112 partially in phantom.

Figure 9:
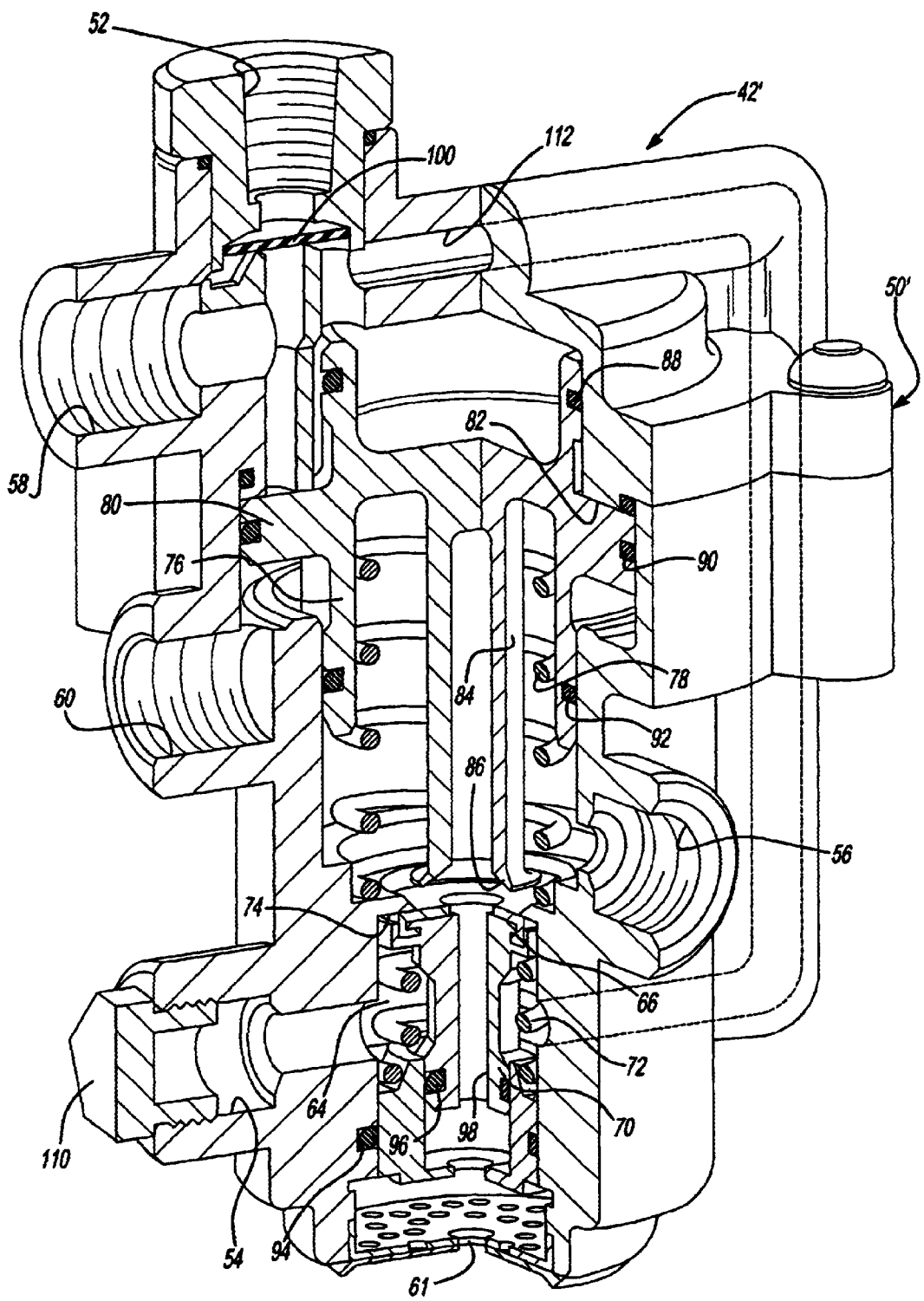
FIG. 9 is a partially cutaway perspective illustration of the embodiment of FIG. 8 in a first operating condition where the vehicle parking brake is applied.

FIG. 9 illustrates the combination valve 42' in a first operation condition. This condition corresponds to the parking brake being applied with no braking force at the foot pedal 22. Under these circumstances, there is no pressure within the valve 42' and the piston 76 and 70 are in rest positions as dictated by the bias of the springs 78 and 72, respectively. The flow path from the spring chamber 48 through the exhaust 61 is open.

When the parking brake is released, for example by operating the dash valve 40, pressure is present at the port 52, which deflects the seal member 100. Accordingly, fluid flow occurs as shown at 114 of FIG. 10. Some of this fluid pressure urges the piston 76 against the bias of the spring 78 until the arm 84 contacts and moves the seal member 66 away from the surface 74. In this position (see the positions of arm by and seal 66 shown in FIG. 5), the opening 68 is open and fluid pressure from the port 52 flows through the passage 112 through passage 114 of FIG. 10 and then out to the spring chamber 48 to release the parking brake force applied by the spring 49. Therefore, the illustration of FIG. 10 shows the valve 42' in a charging condition where the parking brake is being released but the valve has not yet reached the "lap" position described above.

When the brakes are applied and the braking system is operating properly, pressure is present at the ports 58 and 60 so that the pressure on the primary side of the flange 80 cancels out the pressure on the secondary side of the flange 80. Therefore, applying the brakes under normal driving conditions preferably does not alter the position of the components within the valve 42'.

Under some circumstances, it is possible for the pressure in the primary brake line to be less than that which is required to apply the brakes. This may occur, for example, when one of the brake supply lines is damaged or broken. The valve 42' accommodates the situation as follows.

As shown in FIG. 11, as the foot pedal 22 is used to apply the brakes, pressure builds up on the secondary side of the flange 80 because of pressure applied at the port 60, which corresponds to the pressure in the secondary brake circuit 30. Because there is a pressure failure in the primary lines, there is no pressure at the port 58. Accordingly, the pressure from the secondary brakes tends to urge the piston 76 in a direction consistent with the bias of the spring 78. This pressure and the spring 72 move the piston 70 upward so that the seal member 66 separates from the surface 74. This allows air from the spacing brake chamber 48 to pass between the seal member 66 and the surface 74.

The more that the opening 68 is opened, the more pressure that is released from the spring chamber 48. As the pressure is reduced, the spring 49 applies a braking force. Therefore, the valve 42' provides the ability to have the spring 49 apply a braking force when there is a failure within the primary braking supply lines. Moreover, the valve 42' allows the braking force applied by the spring 49 to be proportional to the amount of pedal actuation by the operator. In the event that the pressure within the secondary lines and at the port 60 is great enough such that the piston 76 is moved upward (according to the drawings), sufficiently far to open the passageway 98, all pressure is evacuated from the spring chamber 48 through the exhaust 61 so that the spring 49 acts as an emergency brake.

Figure 12:
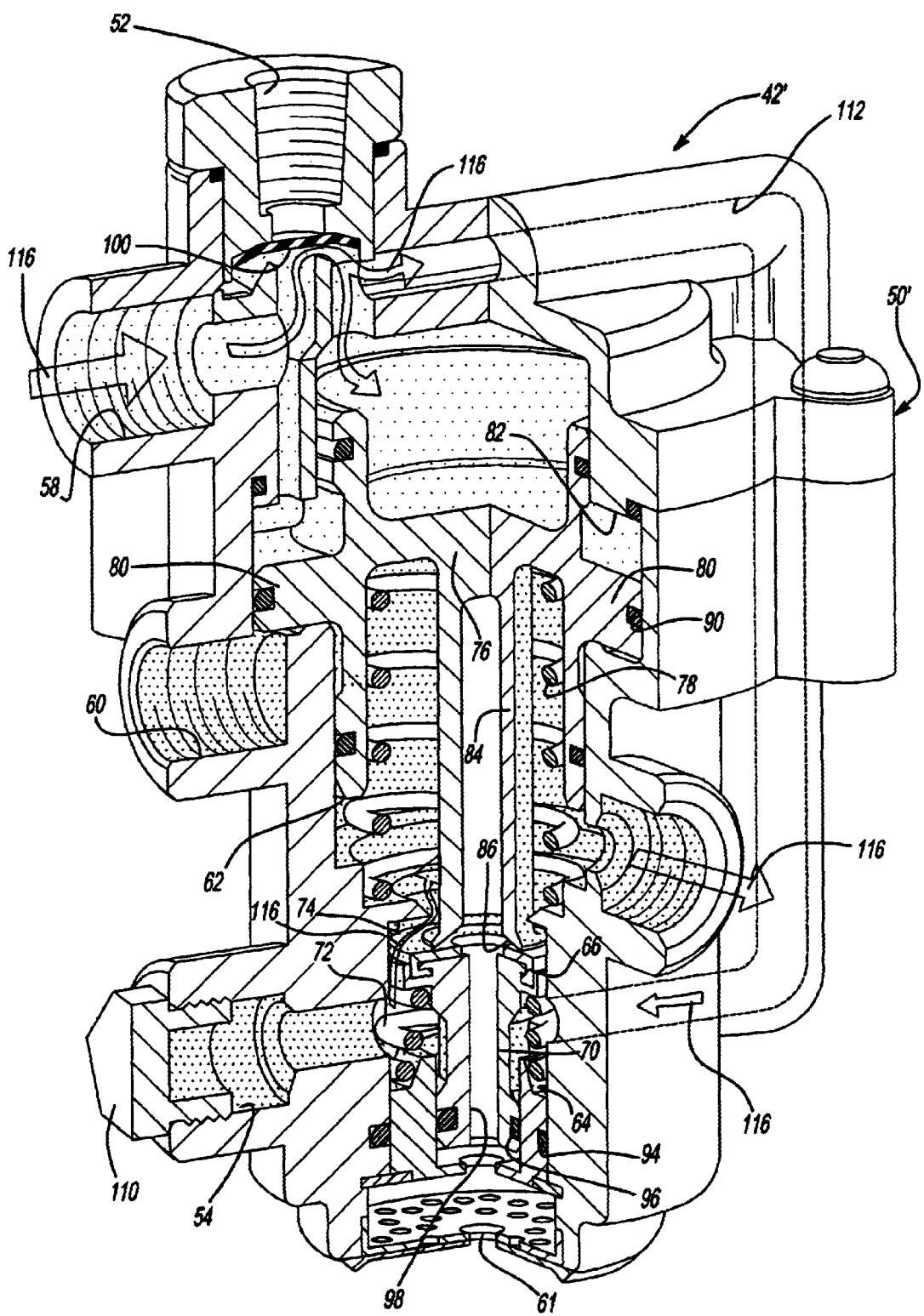
FIG. 12 is an illustration of the embodiment of FIGS. 8–11 in another operation condition where the valve provides an anti-compounding feature when the parking brake is applied.

The embodiment of FIGS. 9–11 preferably also provides an anti-compounding feature much like that described in connection with the previous example. This feature is shown in FIG. 12. Assuming that the valve 42 is originally in the position illustrated in FIG. 9, the spring 49 applies a parking brake force. In the event that someone in the vehicle operates the foot pedal 22, pressure is built up at the ports 58 and 60. The valve member 100 closes off the port 52. Pressure from the primary brake lines 34 through the port 58 then tends to urge the piston 76 against the bias of the spring 78 such that the seal 66 leaves the surface 74 and opens the opening 68. In this instance, a fluid flow 116 results in applying air pressure to the spring chamber 48, which tends to release the braking force applied by the spring 49. As pressure on the foot pedal 22 increases, the fluid flow 116 increases to further release the braking force of the spring 49. Accordingly, the valve 42' provides an anti-compounding feature that avoids additional braking force being applied when the spring 49 is already applying a parking brake force.

As can be appreciated, a valve designed according to this invention provides several significant advantages compared to prior arrangements. One such advantage is the provision of more than one valve function within a single valve housing. This eliminates parts, materials and labor compared to other arrangements. Additionally, the amount of fluid couplings required within the overall braking system is reduced. Eliminating several conduits or air lines eliminates further materials, cost and labor associated with brake systems. This invention provides the ability to directly couple the valve to the spring chamber of the primary brake actuators and directly couple the valve to the pressure reservoir that provides pressure for operating the braking system.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A vehicle brake system, comprising:

at least one brake actuator having a service chamber and an emergency chamber, the service chamber being pressurized to apply a braking force, the emergency chamber being pressurized to hold off a braking element that otherwise provides an emergency braking force;

a pressure source that provides fluid pressure to the brake actuator to control the application of a braking force;

a single combination valve coupling the brake actuator emergency chamber to the pressure source, the combination valve having an inlet coupled to the pressure source and an outlet coupled to the emergency chamber, the valve including a moving member that moves responsive to pressure in the system such that the combination valve is operative as an inversion valve and a relay valve, the moving member moving responsive to pressure at the inlet from a first position where pressure is exhausted from the emergency chamber to a second position where the emergency chamber is pressurized; and wherein the combination valve includes a second inlet in communication with the service chamber and wherein a failure of pressure at the second inlet during a braking application results in movement of the moving member from the second position toward the first position such that pressure is released from the emergency chamber.

2. The system of claim 1, including a manually operated brake pedal that a driver uses to apply the service brakes and wherein the amount of movement of the moving member within the combination valve corresponds to an application force applied to the brake pedal such that the pressure within the emergency chamber is controlled responsive to the amount of application force.

3. The system of claim 2, wherein the combination valve includes a third inlet in communication with another brake actuator and wherein the moving member includes a flange positioned between the second and third inlets such that differences in pressure at the second and third inlets influence the position of the moving member within the valve.

4. The system of claim 1, wherein the moving member is moveable along a single axis.

5. A vehicle brake system, comprising:
at least one brake actuator having a service chamber and an emergency chamber, the service chamber being pressurized to apply a braking force, the emergency chamber being pressurized to hold off a braking element that otherwise provides an emergency braking force;
a pressure source that provides fluid pressure to the brake actuator to control the application of a braking force;
a single combination valve coupling the brake actuator emergency chamber to the pressure source, the combination valve having an inlet coupled to the pressure source and an outlet coupled to the emergency chamber, the valve including a moving member that moves responsive to pressure in the system such that the combination valve is operative as an inversion valve and a relay valve;
wherein the moving member comprises a piston that moves responsive to pressure at the inlet from a first position where pressure is exhausted from the emergency chamber to a second position where the emergency chamber is pressurized; and
a biasing member that biases the moving member into a position where the emergency chamber is exhausted to atmosphere.

6. The system of claim 5, wherein the moving member comprises a control member and a piston and including a biasing member that biases the piston away from the control member.

7. A combination valve for use in a vehicle brake system, comprising:
a valve housing having at least a first inlet adapted to be coupled to a pressure source of the brake system and at least one outlet adapted to be coupled to an emergency chamber of a primary brake actuator in the system and an exhaust port that is adapted to couple the emergency chamber to atmosphere;
a pressure control member within the valve housing that is biased into an exhaust position to couple the outlet to the exhaust port;
a piston housed within the valve housing such that the piston is moveable within the housing responsive to pressure at the first inlet to move the pressure control member out of the exhaust position such that pressure from the pressure source can be supplied through the outlet to the emergency chamber of the primary brake actuator; and
including a primary inlet that is adapted to be coupled in fluid communication with a service brake chamber of the primary brake actuator, a secondary inlet that is adapted to be coupled in fluid communication with a secondary brake actuator in the system, and wherein the piston includes a flange that is positioned between the primary inlet and the secondary inlet such that pressure at the respective inlets is incident on opposite sides of the flange and a difference in pressure at the respective inlets tends to cause the piston to move within the housing.

8. The valve of claim 7, including a second inlet adapted to be coupled directly to the pressure source and wherein the pressure control member blocks communication between the second inlet and the outlet when the control member is in the exhaust position.

9. The valve of claim 7, including a fluid flow passage within the housing extending within the housing to allow fluid communication from near the inlet to the outlet and wherein the control member is effective to close off the fluid flow passage when the control member is in the exhaust position.

10. The valve of claim 7, including a check valve member associated with the first inlet such that pressure at the primary inlet causes the check valve member to close off the first inlet when there is no pressure simultaneously at the first inlet such that pressure from the primary inlet causes movement of the piston sufficient to move the control member out of the exhaust position.

11. The valve of claim 7, wherein movement of the piston responsive to at least one of the primary or secondary inlet pressure is proportional to such pressure.

12. The valve of claim 7, wherein the moving member is moveable along a single axis.

13. A combination valve for use in a vehicle brake system, comprising:
a valve housing having at least a first inlet adapted to be coupled to a pressure source of the brake system and at least one outlet adapted to be coupled to an emergency chamber of a primary brake actuator in the system and an exhaust port that is adapted to couple the emergency chamber to atmosphere;
a pressure control member within the valve housing that is biased into an exhaust position to couple the outlet to the exhaust port;
a piston housed within the valve housing such that the piston is moveable within the housing responsive to pressure at the first inlet to move the pressure control member out of the exhaust position such that pressure from the pressure source can be supplied through the outlet to the emergency chamber of the primary brake actuator; and
including a biasing member that biases the piston into a position where the piston does not contact the control member and pressure at the first inlet operates against the bias of the biasing member to move at least a portion of the piston into a position to move the control member.

14. The valve of claim 13, including a control bias member that biases the control member into the exhaust position and wherein the piston includes an arm that extends outward from a remainder of the piston and the arm contacts the control member to move the control member in a direction against the bias of the control bias member out of the exhaust position.

15. The valve of claim 14, wherein the control member includes a seal that has an opening that is in fluid communication with the exhaust port and wherein the arm on the piston contacts the seal such that the seal opening is closed by the arm.

16. A vehicle brake system, comprising:
   at least one brake actuator having a service chamber and an emergency chamber, the service chamber being pressurized to apply a braking force, the emergency chamber being pressurized to hold off a braking element that otherwise provides an emergency braking force;
   a pressure source that provides fluid pressure to the brake actuator to control the application of a braking force;
   a single combination valve coupling the brake actuator emergency chamber to the pressure source, the combination valve having an inlet coupled to the pressure source, an exhaust port coupled to atmosphere, and an outlet coupled to the emergency chamber, the valve including a control member that is biased into a position to couple the outlet to the exhaust port, the control member moving responsive to pressure in the system such that the combination valve is operative as a combination inversion valve and quick release valve; and
   wherein the control member comprises a piston that moves responsive to pressure at the inlet from a first position where pressure is exhausted from the emergency chamber to a second position where the emergency chamber is pressurized and wherein the valve includes a second inlet in communication with the service chamber and wherein a failure of pressure at the second inlet during a braking application results in movement of the piston from the second position toward the first position such that pressure is released from the emergency chamber.

17. The system of claim 16, wherein the valve has a housing that includes a fluid communication passage within the housing between the inlet and the outlet and wherein movement of the control member controls an amount of fluid movement through the communication passage.

18. The system of claim 16, including a manually operated brake pedal that a driver uses to apply the service brakes and wherein the amount of movement of the piston within the combination valve corresponds to an application force applied to the brake pedal such that the pressure within the emergency chamber is controlled responsive to the amount of application force.

19. The system of claim 16, wherein the control member is moveable along a single axis.

20. A vehicle brake system, comprising:
   at least one brake actuator having a service chamber and an emergency chamber, the service chamber being pressurized to apply a braking force, the emergency chamber being pressurized to hold off a braking element that otherwise provides an emergency braking force;
   a pressure source that provides fluid pressure to the brake actuator to control the application of a braking force;
   a single combination valve coupling the brake actuator emergency chamber to the pressure source, the combination valve having an inlet coupled to the pressure source, an exhaust port coupled to atmosphere, and an outlet coupled to the emergency chamber, the valve including a control member that is biased into a position to couple the outlet to the exhaust port, the control member moving responsive to pressure in the system such that the combination valve is operative as a combination inversion valve and quick release valve; and
   wherein the control member comprises a piston having a flange portion and wherein the valve includes a fluid coupling to the primary service chamber on one side of the flange and a second fluid coupling to a secondary brake service chamber and wherein pressure within the respective service chambers influences the position of the piston within the valve.

* * * * *